United States Patent [19]
Tachibana

[11] Patent Number: 6,083,555
[45] Date of Patent: Jul. 4, 2000

[54] METHOD FOR RAISING SWINE AND FEED USED THEREFOR

[75] Inventor: Fumio Tachibana, Tsukuba, Japan

[73] Assignee: National Federation of Agricultural Co-Operative Associations, Tokyo, Japan

[21] Appl. No.: 09/152,488

[22] Filed: Sep. 14, 1998

[51] Int. Cl.$^7$ ........................................................ A23J 1/00
[52] U.S. Cl. ............................................. 426/656; 426/807
[58] Field of Search ...................................... 426/656, 807

[56] References Cited

FOREIGN PATENT DOCUMENTS 1310232  3/1973  United Kingdom .

OTHER PUBLICATIONS

DeSchrivjer et al., EAAP Publ., vol. 88, p. 363–367, 1997.
Bradford et al., Anim. Prod., vol. 52(2), p. 323–330, 1991.
Bradford et al., Anim. Prod. vol. 52(1), p. 185–192, 1991.
Kyriazakis et al., Anim. Prod., vol. 51(1), p. 189–200, 1990.
Nam et al., Can J. Anim. Sci., vol. 75, p. 93–98, 1995.
Henry, Y., *Reproduction, Nutrition, Development,*vol. 33, No. 6, pp. 489–502, (Jul. 26, 1993).

*Primary Examiner*—Chhaya D. Sayala
*Attorney, Agent, or Firm*—Birch, Stewart, Kolasch & Birch, LLP

[57] ABSTRACT

A novel method for growing pigs by which excess intake of nutritions is prevented while attaining sufficient growth, as well as a feed used therefor, is disclosed. In the method for growing pigs according to the present invention, a first diet having an energy content in terms of TDN of not less than 72%, a crude protein content of 8% by weight to 23% by weight, and a lysine content of 0.3% by weight to 1.5% by weight, and a second diet having an energy content in terms of TDN of not less than 72%, a crude protein content of 13% by weight to 28% by weight, and a lysine content of 1.0% by weight to 2.0% by weight are fed such that the pigs can access to either of said first and second diets ad libitum. The crude protein content in the second diet is higher than that of the first diet and the difference therebetween is not less than 5% by weight, and the lysine content in the second diet is higher than that of the first diet and the difference therebetween is not less than 0.5% by weight. The first and second diets contains 30–90 parts by weight of isoleucine, 31–91 parts by weight of total of methionine and cysteine, 33–98 parts by weight of threonine, and 10–29 parts by weight of tryptophan per 100 parts by weight of lysine.

6 Claims, 2 Drawing Sheets

METHOD FOR RAISING SWINE AND FEED USED THEREFOR

BACKGROUND OF THE INVENTION

I. Technical Field

The present invention relates to a method for growing pigs and feed used therefor.

II. Description of the Related Art

In the field of swine production, from the birth to shipping, pigs are generally fed with 5 to 6 types of diets depending on the growth stage thereof. During this period, the body weight of the pigs is increased to about 110 kg, and nutritional requirements for increasing the body weight changes in a short period of time. It is basically impossible to follow the rapid change in the nutritional requirements with only the 5 or 6 types of feed. Therefore, diets containing more nutritions than the required levels depending on the growth stage are usually fed in order to prevent subalimentation. Thus, pigs are always fed with hypernutritive feed. Further, depending on the feedings, subalimentation may be caused. In this case, growth is slow, which is undesirable in view of economy. In the conventional methods, in cases where female pigs and castration pigs are raised together, the contents of the feed are usually so selected as to meet the requirements by the female pigs which demand more nutritions than castration pigs. This also contributes to the continued feeding of hypernutritive diets. With such a conventional feeding, not only are the costs of the diets high due to the use of hypernutritive diets, but also the amount of excretion of the excess nutrition components such as nitrogen is large, which adversely affects the environment. Further, much labor is required for changing the diets while continuously measuring the body weights of the pigs, which is a big obstacle to labor-saving for reducing the production cost.

To overcome this problem, a feeding in which pigs can voluntarily choose the diets required for the growth has been proposed (Nam DS et al., Can. J. Anim. Sci., 75:93–98, 1995). However, partly due to the fact that eating behavior of pigs is not clear, this idea is limited only to the research level. Further, the studies which have been made so far include cases where the pigs themselves cannot select the correct nutrients so that their growth was slower than the conventional methods; and cases where the pigs took excess nutrients so that the raising cost was increased, although it was proved that pigs can selectively have the diet with high nutrients and the diet with low nutrients. Thus, the choice feeding is far from the level which can be practically used.

SUMMARY OF THE INVENTION

An object of the present invention is to provide a novel method for growing pigs which prevents feeding of excess nutrients and yet attains sufficient growth, and to provide a feed used therefor.

The present inventor intensively studied to discover that by feeding two types of diets, one of which has a higher crude protein content and a higher lysine content than the other, each of which has a prescribed energy content and a prescribed amino acid balance, such that the pigs can access to either of the diets ad libitum, selection of the diets is appropriately carried out by the pigs themselves, so that feeding of excess nutrients can be prevented and yet sufficient growth of the pigs can be attained, thereby completing the present invention.

That is, the present invention provides a method for growing pigs comprising feeding to pigs a first diet having an energy content in terms of TDN of not less than 72%, a crude protein content of 8% by weight to 23% by weight, and a lysine content of 0.3% by weight to 1.5% by weight, and a second diet having an energy content in terms of TDN of not less than 72%, a crude protein content of 13% by weight to 28% by weight, and a lysine content of 1.0% by weight to 2.0% by weight, such that the pigs can access to either of the diets ad libitum, the crude protein content in said second diet being higher than that of said first diet and the difference between the crude protein contents in said first and second diets being not less than 5% by weight, the lysine content in said second diet being higher than that of said first diet and the difference between the lysine contents in said first and second diets being not less than 0.5% by weight, said first and second diets containing 30–90 parts by weight of isoleucine, 31–91 parts by weight of total of methionine and cysteine, 33–98 parts by weight of threonine, and 10–29 parts by weight of tryptophan per 100 parts by weight of lysine. The present invention also provides a feed for growing pigs comprising combination of said first and second diets.

The nutrients required by pigs differ from pig to pig depending on the variety, sex, body weight, environmental conditions such as temperature, and existence of a disease which the pig suffers from. According to the present invention, each pig can take diets responding to the nutriture of itself. Therefore, with the method of the present invention, the growth rate is higher than with the conventional methods, and the growth of small pigs and weak pigs does not delay from the growth of other pigs. Thus, the distribution of the growth stages in a piggery can be reduced, which enables labor-saving and precise control of the pigs. Since female pigs and castration pigs respectively take their intake patterns meeting the requirements by themselves, the effect of growing female and male pigs separately can be obtained in small farms which do not afford to grow female and male pigs separately. In controlling the feeding, the present invention eliminates the need to change the diets depending on the growth stage, which change is troublesome to pig raisers. Therefore, measuring the body weights of the pigs needed for precise control of the body weights is no longer necessary, so that labor can be reduced very much.

Further, by the present invention, the crude protein and essential amino acids such as lysine can be saved when compared with the conventional methods. This enables large decreases in the feed cost in swine production, so that pork can be produced inexpensively. Decrease in the protein intake contributes to largely decrease N excretion through feces and urine of the pigs. In recent years, pollution of lakes and ponds with the excreted nitrogen is a serious consideration. The present invention provides means which may be effective for overcoming the environmental problems in pig raising.

DETAILED DESCRIPTION OF THE PREFERRED EMBODIMENTS

Figure 1:
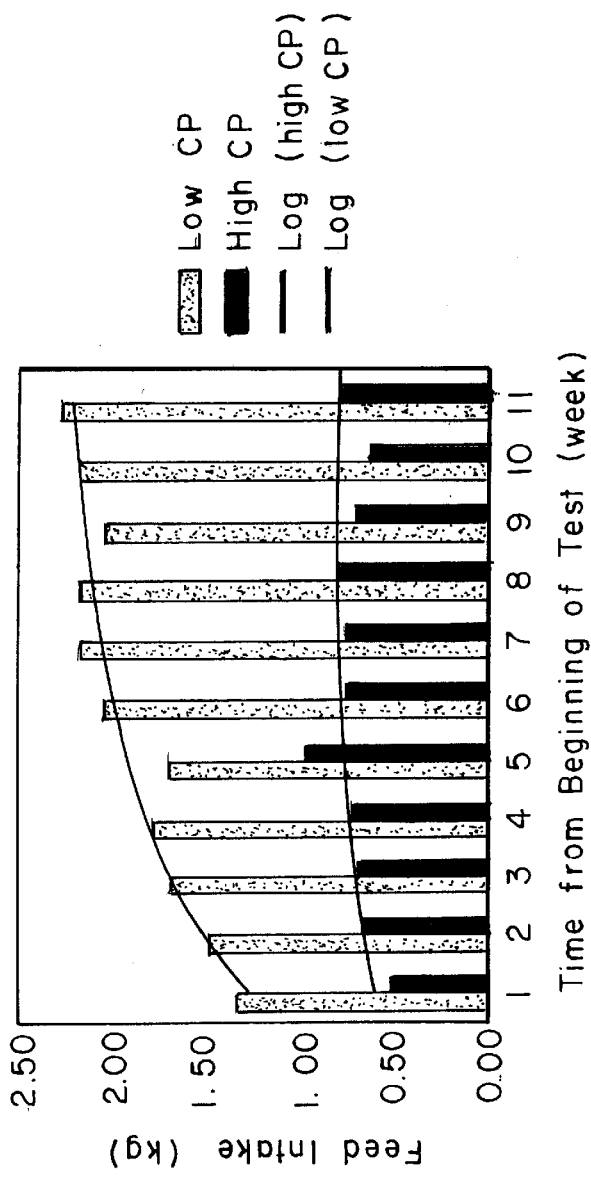
FIG. 1 shows the change with time in feed intake pattern in Example 1 according to the present invention.

In the method for growing pigs according to the present invention, at least two diets, that is, a first diet with a low content of crude protein and a low content of lysine, and a second diet having contents of these higher than those of the first diet are used. The first diet has a crude protein content of 8% by weight to 23% by weight, and a lysine content of 0.3% by weight to 1.5% by weight. The second diet has a crude protein content of 13% by weight to 28% by weight, and a lysine content of 1.0% by weight to 2.0% by weight. The difference between the crude protein contents in the first and second diets is not less than 5% by weight, preferably not less than 10% by weight. If this difference is less than 5% by weight, the effect to prevent excess intake of nutritions is not obtained. The difference between the lysine contents in the first and the second diets is not less than 0.5% by weight, preferably not less than 0.7% by weight. If this difference is less than 0.5% by weight, the effect to prevent excess intake of nutritions is not obtained.

Both of the first and the second diets have TDNs (total digestible nutritions) of not less than 72%. It should be noted that DE (kcal/100 g, digestible energy) can be calculated by 5.84*DCP (digestible protein)+4.1 (TDN−DCP), and ME (metabolizable energy) can be calculated by DE*0.965 (Japanese Feeding Standard (1998), pp.4–5, Edited by Agriculture, Forestry and Fisheries Research Council Secretariat, Ministry of Agriculture, Forestry and Fisheries). If the TDNs of both the first and the second diets are less than 72%, sufficient growth is not attained. If the TDN of one of the diets is less than 72%, the intake of that diet is increased, so that the effect to prevent excess intake of nutritions cannot be obtained.

Each of the first and the second diets contains 30–90 parts by weight, preferably 42–78 parts by weight of isoleucine, 31–91 parts by weight, preferably 43–79 parts by weight of sum of methionine and cysteine, 33–98 parts by weight, preferably 46–85 parts by weight of threonine and 10–29 parts by weight, preferably 13–25 parts by weight of tryptophan per 100 parts by weight of lysine. If the ratios of the lysine to those amino acids are outside the ranges mentioned above, sufficient growth while preventing excess intake of nutritions, which is the effect of the present invention, cannot be attained. Although the sum of methionine and cysteine is as mentioned above, since methionine is an essential amino acid, not less than 30% by weight, preferably not less than 40% by weight of the sum is methionine. Further, the term "cysteine" used herein includes "cystine" formed by bonding cysteine molecules through disulfide bond.

Each of the first and the second diets contains essential amino acids other than those mentioned above as the conventional feeds. The contents thereof may be about the same as those in the conventional feeds. That is, each of the first and the second diets may preferably have an arginine content of 17–140 parts by weight (more preferably 17–50 parts by weight), histidine content of 16–48 parts by weight, leucine content of 50–210 parts by weight (more preferably 50–150 parts by weight), the sum of phenylalanine and tyrosine of 48–180 parts by weight (more preferably 48–143 parts by weight (in the sum of these, not less than 30% by weight is phenylalanine), and a valine content of 34–102 parts by weight.

The above-mentioned amino acid balance may be attained by appropriately selecting the materials of the diets or by adding a small amount of purified amino acid such as lysine (crystalline amino acid) or a food containing the desired amino acid at a high concentration.

The first and the second diets, like the conventional feeds, contain vitamins and minerals such as calcium and phosphorus. The contents of these may be about the same as in the conventional feeds. That is, the calcium content may preferably be 0.5% by weight to 1.5% by weight, and non-phytin phosphorus content may preferably be 0.2% by weight to 1% by weight. The calcium/total phosphorus ratio may preferably be 1.0–2.5, more preferably 1.0–2.0. The contents of other minerals and vitamins should meet, like the conventional feeds, the amounts required by the pigs. These amounts required by pigs are described in, for example, Japanese Feeding Standard (1998), pp.18–19, Edited by Agriculture, Forestry and Fisheries Research Council Secretariat, Ministry of Agriculture, Forestry and Fisheries).

The first and the second diets may be constituted by usual materials for feed for pigs. That is, materials usually used such as cereals including maize, grain sorghum, wheat, barley, rye, oats and unpolished rice; brans such as wheat bran, corn gluten feed, corn gluten meal and rice bran; plant draffs such as soybean cake, rape cake, cotton seed meal and sunflower meal; and fish meal, meat and bone meal, blood meal, feather meal, skimmilk powder, whey, casein and the like, may be used. Further, as mentioned above, amino acids, vitamins and minerals may be added as required.

Needless to say, the first and the second diets preferably do not contain a material contaminated with a mycotoxin such as aflatoxin, or a material such as ergot, containing anti nutrition factors.

The TDN, DCP, amount of crude protein, content of the amino acids such as lysine may be measured by the methods well-known in the art. That is, TDN and DCP may be obtained by multiplying the each TDN or DCP value of each material by the mixing ratio of the material and by totaling the calculated values. The TDN value and DCP value for each material are described in, for example, Japanese Feeding Standard (1995), pp. 135–169, Edited by Agriculture, Forestry and Fisheries Research Council Secretariat, Ministry of Agriculture, Forestry and Fisheries). The amount of crude protein can be obtained by measuring nitrogen content by Kjeldahl procedure, and then multiplying the measured value by 6.25. Detailed method therefor is described in, for example, AOAC eds., Official method of analysis ($16^{th}$ ed.). Association of Analytical Chemists. Washington D.C. (1955). The contents of the amino acids such as lysine, except for tryptophan, can be measured by hydrolyzing the materials with 6N HCl at 110°C. for 22 hours and then by carrying out ion-exchange chromatography. Tryptophan can be measured by decomposing the materials with an alkali and then by carrying out HPLC.

In the method of the present invention, pigs are fed with the first and the second diets such that the pigs can voluntarily take either of the diets. By so doing, as described concretely in the Examples below, pigs instinctively choose the appropriate diets responding to the variety, sex, body weight, temperature, existence of disease, nutriture and the like of themselves. As a result, excess intake of nutritions is prevented and yet sufficient growth is attained. In addition to the first and the second diets, additional one or more diets may be given in an amount not adversely affecting the effects of the present invention.

The method of the present invention may be employed for growing pigs from piglets at late lactation stage with a body weight of about 10 kg to grown pigs ready for shipment.

In the method of the present invention, substantially all types of self-feeders such as box type feeders and wet feeders may be employed. In a piggery, each of the two or more diets is placed in the respective self-feeder. The arrangement of the self-feeders should not be changed once the feeding according to the present invention is started in order not to confuse the learning by the pigs.

EXAMPLES

The present invention will now be described more concretely by way of examples thereof. It should be noted that the examples are presented for the illustration purpose only and should not be interpreted in any restrictive way.

Example 1

Comparative Example 1

Using pigs with a body weight of 30 kg (20 pigs per group), the effects obtained by giving two types of commercially available diets (Comparative Example 1), and by giving the diets according to the present invention (choice method) were compared. In the conventional method (Comparative Example 1), a diet for piglets having CP (crude protein) of 16% and TDN of 78% (lysine 0.87%) and a diet for fattening having CP (crude protein) of 15% and TDN of 77% (lysine 0.80%) were fed. The diet for piglets was changed to the diet for fattening when the pigs reached to a body weight of 65 kg, and raising was continued until each pig reached to a body weight of 115 kg. Similarly, in the method according to the present invention (Example 1), a high CP diet (CP 25%, TDN 74% (lysine 1.35%)) and a low CP diet (CP 10%, TDN 79% (lysine 0.59%)) were fed such that the pigs can access to either of the diets ad libitum until each pig reached to a body weight of 115 kg. Each diet was placed in a respective box type self-feeder and pigs were allowed to have either of the diets ad libitum. The compositions of the diets used are shown in Table 1 below.

TABLE 1

|  | Comparative Example 1 | | Example 1 | |
| --- | --- | --- | --- | --- |
| Feedstuffs | Diet for Piglets | Diet for Fattening | High CP Diet | Low CP Diet |
| Corn | 45 | 30 | 14.8 | 50 |
| Grain Sorghum | 30 | 43 | 30 | 30 |
| Barley | — | — | 10 | 10 |
| Wheat Bran | — | 6 | — | — |
| Soybean Cake | 21 | 17 | 43 | 5.2 |
| Fish Meal | 1.6 | 1.3 | — | — |
| Grease | 0.7 | 0.6 | — | 1.7 |
| Molasses | — | 0.5 | — | — |
| Limestone | 0.9 | 0.97 | 1 | 0.8 |
| Sodium Chloride | 0.25 | 0.25 | 0.25 | 0.25 |
| Dicalcium Phosphate | 0.35 | 0.14 | 0.7 | 1.5 |
| L-lysine | — | 0.04 | 0.01 | 0.28 |
| DL-methionine | — | — | 0.04 | 0.07 |
| Vitamin mineral Premix | 0.2 | 0.2 | 0.2 | 0.2 |

The analyzed compositions of the components in the diets are shown in Table 2 below.

TABLE 2

|  | Content (% by weight) | | | |
| --- | --- | --- | --- | --- |
|  | Comparative Example 1 | | Example 1 | |
| Components | Diet for Piglets | Diet for Fattening | High CP Diet | Low CP Diet |
| Crude Protein | 16.2 | 15.5 | 25.4 | 10.2 |
| Lysine | 0.87 | 0.80 | 1.35 | 0.59 |
| Methionine | 0.25 | 0.25 | 0.43 | 0.18 |
| Cysteine | 0.28 | 0.30 | 0.40 | 0.19 |
| Tryptophan | 0.19 | 0.19 | 0.31 | 0.12 |
| Threonine | 0.67 | 0.62 | 0.96 | 0.39 |
| Isoleucine | 0.64 | 0.57 | 0.96 | 0.36 |
| Arginine | 1.02 | 0.93 | 1.57 | 0.52 |
| Histidine | 0.43 | 0.39 | 0.60 | 0.25 |
| Leucine | 1.52 | 1.38 | 1.99 | 1.02 |
| Phenylalanine | 0.81 | 0.73 | 1.17 | 0.48 |
| Tyrosine | 0.56 | 0.51 | 0.79 | 0.35 |
| Valine | 0.73 | 0.68 | 1.05 | 0.46 |
| Crude Fat | 3.69 | 3.46 | 1.99 | 4.41 |
| Crude Fiber | 2.45 | 3.13 | 3.92 | 1.92 |
| Crude Ash | 3.63 | 3.83 | 5.24 | 3.80 |
| Calcium | 0.60 | 0.54 | 0.66 | 0.67 |
| Phosphorus | 0.43 | 0.41 | 0.55 | 0.55 |
| Non-phytin P | 0.25 | 0.20 | 0.28 | 0.34 |
| TDN | 78 | 77 | 74 | 79 |
| DCP | 14.4 | 13.3 | 21.4 | 8.6 |
| DB, kcal/kg | 3.443 | 3.388 | 3,393 | 3,393 |

Figure 2:
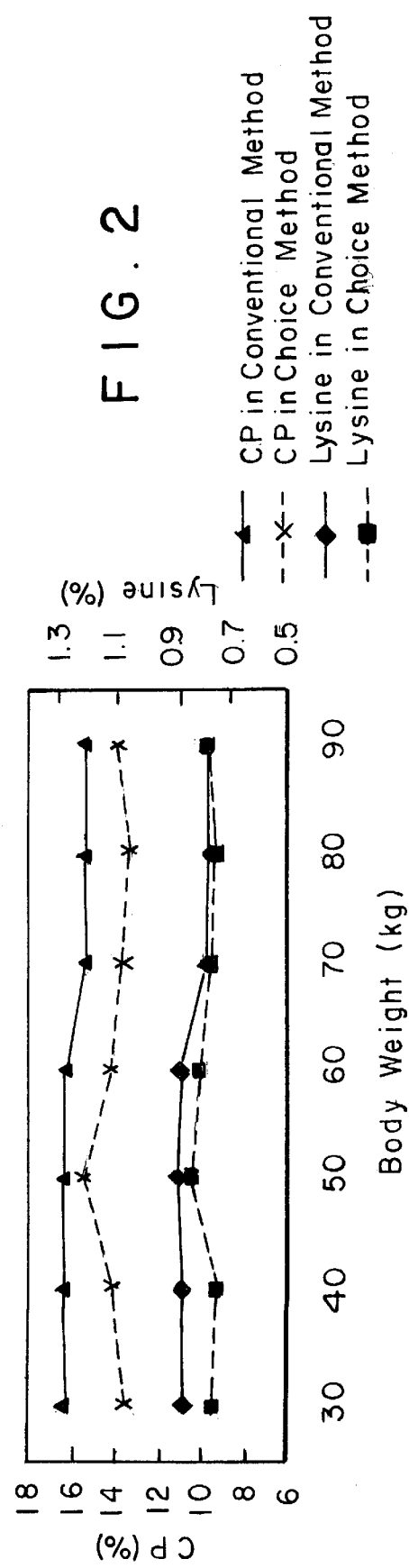
FIG. 2 shows the change with time in the contents of the crude protein and lysine per 1 kg of diets selectively ingested in Example 1 and Comparative Example 1.

The results are shown in Table 3 and in FIGS. 1 and 2. In FIG. 1, in each of the pair of neighboring bars, the higher bar indicates intake of the low CP diet and the lower bar indicates intake of the high CP diet. As shown in FIG. 1, it was confirmed that, as the pigs grew, the pigs by themselves came to prefer low CP diet more than the high CP diet. It was proved that by this self-selection by the pigs, the intake of the crude protein and lysine was able to be largely saved (FIG. 2). By comparing the performance by these two feedings, it is seen that the increase in the body weight and the feed intake were apparently higher in the method of the present invention than in the conventional method. By virtue of this, the cost of the feed per pig was reduced by 290 Yen.

TABLE 3

Comparison Between Conventional Method and Method of the Present Invention

|  | Comparative Example 1 | Example 1 |
| --- | --- | --- |
| Daily Gain (g) | 837 | 879 |
| Feed Intake (g) | 2,638 | 2,731 |
| Difference in Costs (Yen) of Feeds per Pig Between Conventional Method and Present Invention | 0 | −290 |

Example 2

Comparative Example 2

Administration of Male and Female According to the Present Invention

Figure 3:
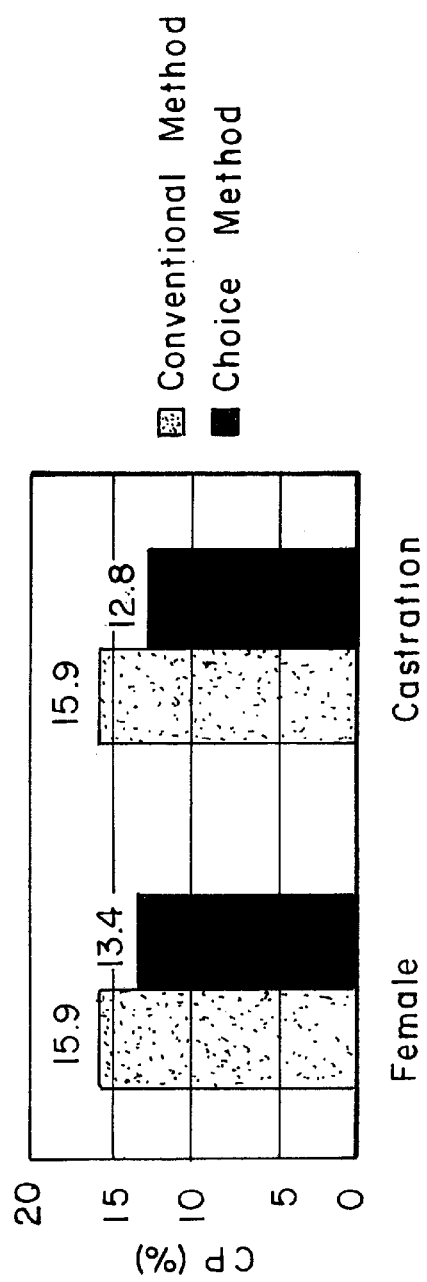
FIG. 3 shows the crude protein intake per 1 kg of ingested diets in Example 2 (choice) and in Comparative Example 2 (conventional method).
Figure 4:
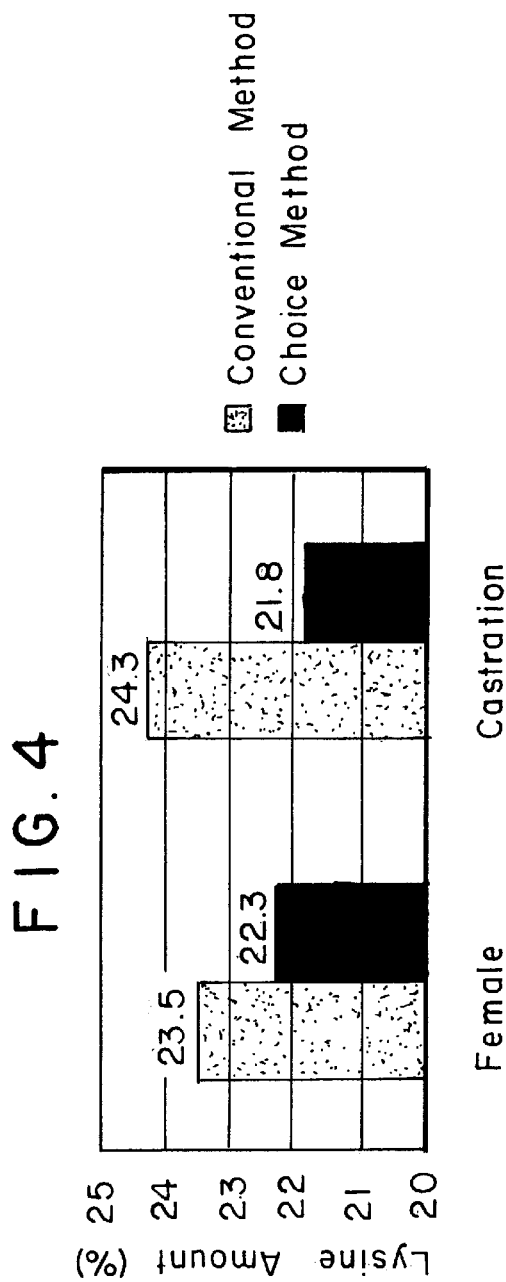
FIG. 4 shows lysine intake per 1 kg of gain in Example 2 (choice) and in Comparative Example 2 (conventional method).

Using the same diets and method as in Example 1, the effects on the growth of the male and female pigs when they were raised together and on the dressed carcasses by feeding two types of commercially available diets (Comparative Example 2) and by the method according to the present invention (Example 2, choice method) were examined using pigs with a body weight of 30 kg. When a pig reached to a body weight of 115 kg, the pig was slaughtered, dissected and examined. The results are shown in Tables 4 and 5 below and in FIGS. 3 and 4. In FIGS. 3 and 4, in each pair of the neighboring bars, the higher bar indicates the results of Comparative Example 2 and the lower bar indicates the results of Example 2.

TABLE 4

Comparison of Growth of Male and Female Pigs in Conventional Method and Method of the Present Invention

|  | Comparative Example 2 | | Example 2 | |
| --- | --- | --- | --- | --- |
|  | Female | Castration | Female | Castration |
| Daily Gain (g) | 854 | 929 | 890 | 935 |
| Feed Intake (g) | | 2,674 | | 2,690 |

TABLE 5

Influence on Carcass Characteristics

|  | Female Pigs | | Castration Pigs | |
| --- | --- | --- | --- | --- |
| Item | Comparative Example 2 | Example 2 | Comparative Example 2 | Example 2 |
| Body Weight When Shipped, kg | 107.3 | 107.1 | 106.8 | 107.6 |
| Fat Depth |  |  |  |  |
| Shoulder, cm | 3.9 | 3.9 | 4.1 | 3.8 |
| Back, cm | 1.9 | 1.9 | 2.3 | 2.1 |
| Loin, cm | 3.0 | 3.1 | 3.1 | 3.0 |
| Average of 3 Parts, cm | 2.9 | 3.0 | 3.2 | 3.0 |

If castration pigs are grown by the conventional method, crude protein and lysine are excessively ingested because the feed intake is large, in spite of the fact that the requirements of crude protein and lysine by castration pigs are smaller than those required by female pigs. Further, there is a problem that the fat depth in dressed carcass is large. In Example 2 in which the pigs are grown by the choice method according to the present invention, the castration pigs took crude protein and lysine so as to meet the requirements (FIGS. 3 and 4). Therefore, although the daily gain of the castration pigs was smaller than that of the female pigs, the fat depth in the dressed carcass was apparently improved.

I claim:

1. A method for growing pigs comprising feeding to pigs a first diet having an energy content in terms of total digestable nutrition (TDN) of not less than 72%, a crude protein content of 8% by weight to 23% by weight, and a lysine content of 0.3% by weight to 1.5% by weight, and a second diet having an energy content in terms of TDN of not less than 72%, a crude protein content of 13% by weight to 28% by weight, and a lysine content of 1.0% by weight to 2.0% by weight, such that the pigs can access to either of said first and second diets ad libitum, the crude protein content in said second diet being higher than that of said first diet and the difference between the crude protein contents in said first and second diets being not less than 5% by weight, the lysine content in said second diet being higher than that of said first diet and the difference between the lysine contents in said first and second diets being not less than 0.5% by weight, said first and second diets containing 30–90 parts by weight of isoleucine, 31–91 parts by weight of total of methionine and cysteine, 33–98 parts by weight of threonine, and 10–29 parts by weight of tryptophan per 100 parts by weight of lysine.

2. The method according to claim 1, wherein the difference between the crude proteins in said first and second diets is not less than 10% by weight, and the difference between the lysine in said first and second diets is not less than 0.7% by weight.

3. A feed for growing pigs comprising a combination of first and second diets, wherein said first diet has an energy content in terms of TDN of not less than 72%, a crude protein content of 8% by weight to 23% by weight, and a lysine content of 0.3% by weight to 1.5% by weight, and said second diet has an energy content in terms of TDN of not less than 72%, a crude protein content of 13% by weight to 28% by weight, and a lysine content of 1.0% by weight to 2.0% by weight, the crude protein content in said second diet being higher than that of said first diet and the difference between the crude protein contents in said first and second diets being not less than 5% by weight, the lysine content in said second diet being higher than that of said first diet and the difference between the lysine contents in said first and second diets being not less than 0.5% by weight, said first and second diets containing 30–90 parts by weight of isoleucine, 31–91 parts by weight total of methionine and cysteine, 33–98 parts by weight threonine, and 10–29 parts by weight of tryptophan per 100 parts by weight of lysine.

4. The method of claim 1, wherein each of the first and second diets contain 42–78 parts by weight of isoleucine, 43–79 parts by weight of sum of methionine and cysteine, 46–85 parts by weight of threonine and 13–25 parts by weight of tryptophan per 100 parts by weight of lysine.

5. The method of claim 1, wherein said first and second diets further comprise 17–140 parts by weight of arginine, 16–48 parts by weight of histidine, 50–210 parts by weight of leucine, 48–180 parts by weight of sum phenylalanine and tyrosine and 34–102 parts by weight of valine.

6. The method of claim 1, wherein said first and second diets further contain vitamins and minerals.

* * * * *